United States Patent
Svensson

(10) Patent No.: US 10,696,279 B2
(45) Date of Patent: Jun. 30, 2020

(54) METHOD FOR OPERATING A VEHICLE BRAKE SYSTEM

(71) Applicant: Ford Global Technologies, LLC, Dearborn, MI (US)

(72) Inventor: Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 422 days.

(21) Appl. No.: 15/151,628

(22) Filed: May 11, 2016

(65) Prior Publication Data

US 2016/0332607 A1 Nov. 17, 2016

(30) Foreign Application Priority Data

May 15, 2015 (DE) .......................... 10 2015 208 959

(51) Int. Cl.
| | | |
|---|---|---|
| *B60T 8/17* | (2006.01) | |
| *B60T 13/74* | (2006.01) | |
| *B60T 7/04* | (2006.01) | |
| *B60T 8/176* | (2006.01) | |
| *B60T 7/12* | (2006.01) | |

(52) U.S. Cl.
CPC .............. *B60T 8/176* (2013.01); *B60T 7/042* (2013.01); *B60T 7/12* (2013.01); *B60T 13/745* (2013.01); *B60T 2220/04* (2013.01); *B60T 2270/12* (2013.01); *B60T 2270/82* (2013.01)

(58) Field of Classification Search
CPC ...... B60T 8/176; B60T 8/1763; B60T 8/1764; B60T 7/04; B60T 7/042; B60T 7/12; B60T 13/74; B60T 13/745; B60T 2270/10; B60T 2270/12; B60T 2270/14; B60T 2270/82
See application file for complete search history.

(56) References Cited

U.S. PATENT DOCUMENTS

| | | | | |
|---|---|---|---|---|
| 5,158,343 | A * | 10/1992 | Reichelt | B60T 13/662 303/113.4 |
| 6,964,460 | B2 * | 11/2005 | O'Dea | B60T 8/1755 303/139 |
| 2013/0080016 | A1 * | 3/2013 | Bohn | B60T 8/176 701/78 |
| 2013/0119752 | A1 * | 5/2013 | Roll | B60T 8/176 |

FOREIGN PATENT DOCUMENTS

| | | |
|---|---|---|
| DE | 102011076675 A1 | 2/2011 |
| DE | 102011071329 A1 | 1/2012 |
| DE | 10290794 B4 | 2/2014 |
| DE | 102013222061 A1 | 9/2014 |
| DE | 102013210563 A1 | 12/2014 |
| DE | 102013218330 A1 | 3/2015 |

* cited by examiner

*Primary Examiner* — Thomas J Williams
(74) *Attorney, Agent, or Firm* — Raymond L. Coppiellie; Burgess Law Office, PLLC

(57) ABSTRACT

A method for operating a hydraulic motor vehicle brake system with an anti-lock brake system having a plurality of brake cylinders associated with the wheels to be braked. A central pressure generating device generates a hydraulic brake pressure, wherein the hydraulic brake pressure is distributed to the brake cylinders and may be selectively modified for individual brake cylinders or a group of brake cylinders. The hydraulic brake pressure maintained at a level exceeding an estimated brake pressure limit of each wheel.

19 Claims, 1 Drawing Sheet

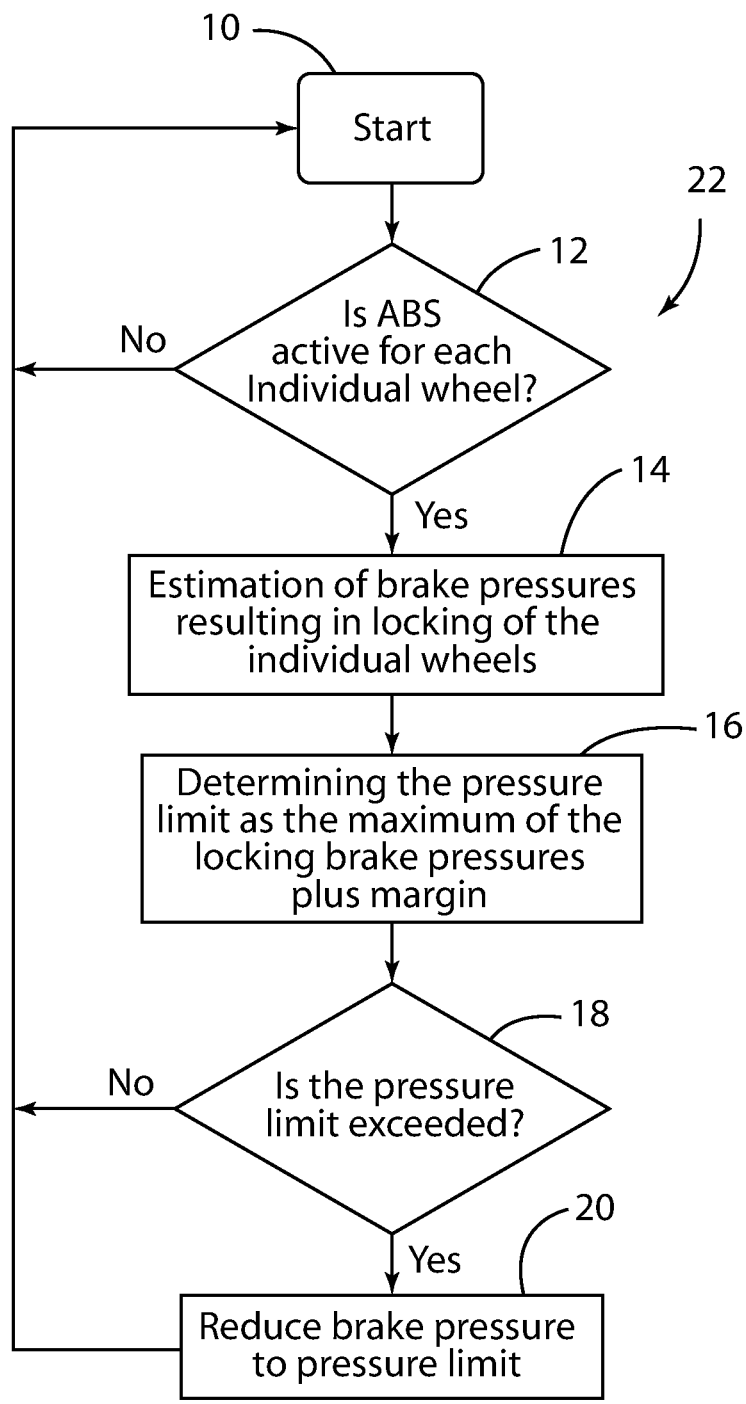

METHOD FOR OPERATING A VEHICLE BRAKE SYSTEM

CROSS-REFERENCE TO RELATED APPLICATIONS

Not Applicable.

BACKGROUND OF THE INVENTION

1. Field of the Invention

The present invention relates to a method for operating a vehicle brake system, and more specifically to a method for limiting brake pressure to a predetermined pressure value.

2. Description of Related Art

Numerous embodiments of vehicle brake systems exist. Anti-lock brake systems (ABS systems) are often part of an electronic stability control system (ESP). Brake systems may vary from the classic hydraulic dual circuit brake systems with a tandem master brake cylinder and hydraulic brake booster to electric motor supported brake systems or Brake-by-Wire systems (BBW). Brake-by-Wire systems using limited mechanical or hydraulic connections between the brake pedal and the brakes. In principle, Brake-by-Wire systems allow greater influence on the brake system by the vehicle control systems.

In a heavy braking process, in particular emergency braking, a conventional brake system rapidly builds up brake pressure, wherein the brake pressure often rises to high values within the specifications of the brake system.

Often the braking effect resulting from the high brake pressure is not fully converted into a corresponding deceleration of the vehicle, because the deceleration depends in particular on the respective road and weather conditions and the resulting adhesion coefficient μ. If the brake force can no longer be converted, wheel slip or wheel locking occurs, which is counteracted in a known way by the ABS, including a targeted reduction of the brake forces on individual wheels or a group of wheels. During a braking process, a situation can develop dynamically. For example when changing from a road surface with high μ (with correspondingly good traction conditions) to a road surface with lower μ (poorer traction conditions—such as wet, snow or ice etc.), often referred to as a negative μ-step. Vehicle dynamics control must react to this rapidly by pumping out low pressure brake fluid accumulators to counteract locking of the rear wheels. Reducing brake pressure, to avoid locking of the individual wheels, can be a problem at high brake pressures.

Further, especially at lower μ values, high brake pressures may cause an unwanted increase in the NVH values (NVH=Noise, Vibration, Harshness).

SUMMARY OF THE INVENTION

A method of operating a brake system of a motor vehicle having a plurality of brake cylinders, each cylinder associated with a wheel. The method including generating a hydraulic brake pressure and obtaining an estimated brake pressure for each wheel that, if applied, would cause wheel lock of the particular wheel. The method including determining a pressure limit based on the maximum estimated brake pressure; and continuously maintaining the hydraulic brake pressure at a constant margin above the pressure limit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a flow chart of one embodiment of the inventive method.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, one embodiment 22 of the inventive method is shown. The method 22 starts at step 10. Initially, at step 12, the method determines whether the ABS mode of the brake system 1 is active for each individual wheel. If not, the method returns to 10 and waits until this condition exists. In an additional embodiment, the determination is implemented as part of a corresponding ABS control routine whereby the determination becomes unnecessary.

Alternatively, it is also conceivable to use the invention for other states in which limiting of the brake pressure is foreseeable, for example in certain ESP uses or applications.

If each individual wheel is in ABS mode, then step 14 estimates a separate brake pressure value for each individual wheel that, if applied, would lock that individual wheel. Different methods for estimating brake pressure values are known in the context of ABS control. One method includes measurement and analysis of the current wheel slip whereby the ABS system obtains a brake pressure value based on an estimation of the pressure value at which each wheel, brake-controlled by the anti-lock brake system, is about to lock. The brake pressure value at which locking of each wheel is incipient being necessary for control of the anti-lock brake system and therefore preferably provided by an ABS control unit.

In step 16 the highest brake pressure value is selected from the brake pressure values for each wheel determined in step 14 and a margin of typically 10 to 25 bar is added to the highest brake pressure value to determine the brake pressure limits to be subsequently used. For example, the brake pressure value for each wheel is compared and the highest value from each of the four wheels is selected as the brake pressure limit. The margin of preferably 10 to 25 bar is added to the determined brake pressure limit to provide an adequate brake pressure reserve for sudden changes in the braking conditions, for example due to an improvement of the traction behavior of the road surface. In the disclosed embodiment, the brake pressure margin being available until a higher maximum pressure value is determined based on updated ABS data, preferably during a regular recalculation, wherein the margin is once again added to the brake pressure limit value.

It is then determined, step 18, whether the current brake pressure generated by pressure generating device, in one example the hydraulic brake cylinder, exceeds the brake pressure limit value, including the margin, established in step 16. In the present example, a pressure sensor measures the current brake pressure generated by the hydraulic brake cylinder. The measured pressure is compared to the brake pressure limit value to determine whether it exceeds brake pressure limit value.

If the measured pressure exceeds the brake pressure limit value, in step 20, the brake pressure is reduced to the brake pressure limit value. The reduction carried out continuously in a ramped manner, or damped with a low-pass filter, in a plurality of steps/loop passes to avoid pressure pulses when the measured pressure exceeds the newly predetermined pressure limit thereby reducing driver perception of the reduction.

In the case of an electrically assisted brake system, an electric motor causes a suitable correction of the pressure by influencing the master brake cylinder or with an additional cylinder. In the case of a Brake-by-Wire system, a controller monitoring the respective pressure values and set points actuates the electric motor as necessary to adjust brake pressure as needed.

The method starts then returns again to step 10 to take into account any changes in the ABS operating conditions (for example changes of the p values, deactivation of the ABS system). If the conditions for the brake pressure reduction are no longer met (for example the end of the ABS mode), the ABS system is deactivated (not shown).

In a preferred embodiment, the brake pressure value predetermined by a driver with a vehicle brake pedal can sometimes be higher than the predetermined maximum pressure value. In such instances, limiting of the driver's intention occurs, which however has no noticeable effects owing to the ABS activities themselves; the activities of the ABS system are usually perceptible by the driver. Similar to reducing the brake pressure, if the brake pressure demanded by the driver is higher than the original pressure limit to avoid pressure pulses or discontinuities any increase of the brake pressure is ramp-shaped or damped with a low-pass filter. In one example, the method is implemented as a background loop within a microprocessor-controlled brake controller. During the activation or deactivation of the pressure limiting, any brake pressure changes occurring can preferably be carried out continuously over a predetermined period to avoid sudden pressure changes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a vehicle brake system comprising:
   generating a hydraulic brake pressure;
   providing a plurality of brake cylinders, each cylinder associated with a wheel;
   obtaining an estimated brake pressure for each wheel resulting in wheel lock;
   determining a pressure limit based on a maximum of the estimated brake pressure for each wheel; and
   continuously maintaining the hydraulic brake pressure at a constant margin above the pressure limit.

2. The method of claim 1 wherein the hydraulic brake pressure correlates to the pressure limit.

3. The method of claim 2 wherein the margin is 10 to 25 bar.

4. The method of claim 1 wherein the hydraulic brake pressure is reduced only when the brake cylinders of all wheels are activated by an anti-lock brake system.

5. The method of claim 1 including a hydraulic brake cylinder with electric motor brake boosting component for generating the hydraulic brake pressure wherein any reduction of hydraulic brake pressure is conducted by the electric motor brake boosting component.

6. The method of claim 1 including using a mechanically decoupled brake pedal to generate hydraulic brake pressure.

7. The method of claim 1 wherein any change in hydraulic brake pressure is made continuously over a predetermined period to avoid sudden pressure changes.

8. The method of claim 1 including the step of using a controller and a motor to increase or decrease hydraulic brake pressure thereby maintaining the hydraulic brake pressure at a constant margin above the pressure limit.

9. A method of operating a vehicle brake system with anti-lock brakes comprising:
   providing a central pressure generating device for generating a hydraulic brake pressure;
   providing a plurality of brake cylinders, each cylinder associated with a wheel to be braked, each brake cylinder connected to the central pressure generating device;
   obtaining an estimated brake pressure limit for each wheel, the estimated brake pressure limit being a brake pressure resulting in a locking of the wheel;
   monitoring the hydraulic brake pressure of the central pressure generating device; and
   maintaining the hydraulic brake pressure in the central pressure generating device at a level that always exceeds the estimated brake pressure limit of each wheel.

10. The method of claim 9 including the step of using a controller and a motor to increase or decrease the hydraulic brake pressure in the central pressure generating device.

11. The method of claim 9 wherein pressure changes in the brake pressure generated by the central pressure generating device ramped in or out over a predetermined period to avoid sudden pressure changes.

12. The method of claim 9 determining a pressure limit based on the highest estimated brake pressure limit for each wheel wherein the hydraulic brake pressure correlates to the pressure limit.

13. The method of claim 9 determining a pressure limit based on the highest estimated brake pressure limit for each wheel wherein the hydraulic brake pressure correlates to the pressure limit and increasing the pressure limit by a predetermined margin.

14. The method of claim 13 wherein the predetermined margin is 10 to 25 bar.

15. The method of claim 9 wherein the hydraulic brake pressure of the central pressure generating device is reduced only when the brake cylinders of all wheels are activated by an anti-lock brake system.

16. The method of claim 9 wherein the central pressure generating device for generating a hydraulic brake pressure is a hydraulic brake cylinder with electric motor brake boosting component, and the step of reducing the hydraulic brake pressure is conducted by the electric motor brake boosting component.

17. The method of claim 9 wherein the central pressure generating device for generating a hydraulic brake pressure includes a mechanically decoupled brake pedal.

18. A method of operating a vehicle brake system comprising:
   providing an antilock braking mechanism for each individual vehicle wheel and estimating a brake pressure for each wheel, the estimated brake pressure being a brake pressure resulted in operation of the antilock braking mechanism for the individual wheel;

determining a pressure limit based on a maximum of the estimated brake pressure for each individual wheel; and reducing and maintaining the brake pressure on each individual vehicle wheel to said pressure limit when the pressure limit is exceeded.

19. The method of claim 18 wherein the step of reducing the brake pressure for each individual vehicle wheel includes providing a central pressure generating device for generating a brake pressure and reducing the brake pressure at said central pressure generating device.

* * * * *